United States Patent
Holm (10) Patent No.: US 9,308,662 B2
(45) Date of Patent: Apr. 12, 2016

(54) AUTOMATICALLY REMOVING WASTE MATERIAL USING A STRIP DIE WHEN CUTTING A SHEET OF MATERIAL ACCORDING TO A PREDETERMINED PATTERN

(71) Applicant: Esko-Graphics Kongsberg AS, Kongsberg (NO)

(72) Inventor: Ivar Holm, Hokksund (NO)

(73) Assignee: Esko-Graphics Kongsberg AS, Kongsberg (NO)

(*) Notice: Subject to any disclaimer, the term of this patent is extended or adjusted under 35 U.S.C. 154(b) by 0 days.

(21) Appl. No.: 14/720,704

(22) Filed: May 22, 2015

(65) Prior Publication Data
US 2015/0370237 A1 Dec. 24, 2015

Related U.S. Application Data

(62) Division of application No. 12/610,167, filed on Oct. 30, 2009, now Pat. No. 9,038,511.

(60) Provisional application No. 61/113,784, filed on Nov. 12, 2008.

(51) Int. Cl.
*B26D 7/20* (2006.01)
*B26D 5/00* (2006.01)
(Continued)

(52) U.S. Cl.
CPC .............. *B26D 7/18* (2013.01); *B26D 7/1818* (2013.01); *B26F 1/3813* (2013.01); *G05B 19/182* (2013.01); *G05B 19/402* (2013.01); *G05B 2219/49372* (2013.01)

(58) Field of Classification Search
CPC . Y10T 83/04; Y10T 83/0448; Y10T 83/0453; Y10T 83/0457; Y10T 83/0467; Y10T 83/0472; Y10T 83/0495; Y10T 83/05; Y10T 83/0524; Y10T 83/0572; Y10T 83/0591; Y10T 83/0605; Y10T 83/141; Y10T 83/145; Y10T 83/148; Y10T 83/152; Y10T 83/162; Y10T 83/202; Y10T 83/2033; Y10T 83/2037; Y10T 83/2046; Y10T 83/2066; Y10T 83/2068; Y10T 83/207; Y10T 83/2074; Y10T 83/2092; Y10T 83/222; Y10T 83/465; Y10T 83/4691; Y10T 83/667; Y10T 83/68; Y10T 83/687; Y10T 83/6895; Y10T 83/869; Y10T 83/929; Y10T 83/9304; Y10T 83/922; Y10T 83/923; B26D 5/00; B26D 5/005; B26D 5/02; B26D 2005/002; B26D 7/0006; B26D 7/01; B26D 7/06; B26D 7/08; B26D 7/0658; B26D 7/18; B26D 7/1518; B26D 7/20; B26D 2007/0018; B26F 1/3813; G05B 19/00; G05B 19/402; G05B 2219/49372
See application file for complete search history.

(56) References Cited

U.S. PATENT DOCUMENTS

| | | | |
|---|---|---|---|
| 4,921,154 A | 5/1990 | Abe et al. | 225/97 |
| 5,322,202 A | 6/1994 | Pelletier | 225/97 |

(Continued)

FOREIGN PATENT DOCUMENTS

| | | |
|---|---|---|
| DE | 102006001803 | 7/2007 |
| DE | 102006050646 | 4/2008 |

(Continued)

OTHER PUBLICATIONS
Office action on EPO patent application No. 09175337.6 mailed Apr. 26, 2012.
(Continued)

*Primary Examiner* — Phong Nguyen
(74) *Attorney, Agent, or Firm* — Dov Rosenfeld; Inventek (57) ABSTRACT

A cutting and stripping apparatus has a controller and causes a strip die to be prepared with cutouts according to a predetermined pattern, e.g., on a cutting table and positioned on a stripping station that has a removal tool to remove waste material. After a sheet of material is cut on the same or another cutting table, the sheet is positioned in the stripping station over the female strip die. The removal tool moves to programmed positions in the stripping station and removes pieces of waste material. The final stripped cut sheet is the brought to the out-stack.

17 Claims, 9 Drawing Sheets

(51) Int. Cl.
*B26D 7/18* (2006.01)
*B26F 1/38* (2006.01)
*G05B 19/18* (2006.01)
*G05B 19/402* (2006.01)

(56) References Cited

U.S. PATENT DOCUMENTS

| | | | |
|---|---|---|---|
| 5,337,639 A | 8/1994 | Morrison | 83/111 |
| 5,402,698 A | 4/1995 | Morrison | |
| 5,443,195 A | 8/1995 | Sinn | 225/104 |
| 5,622,068 A | 4/1997 | Sjoberg | 72/14.8 |
| 5,775,395 A | 7/1998 | Wilkins | 144/286.5 |
| 7,434,373 B2 | 10/2008 | Pommier | 53/435 |
| 2002/0162437 A1 | 11/2002 | Urabe | |
| 2005/0172764 A1 | 8/2005 | Fagan | 83/13 |

FOREIGN PATENT DOCUMENTS

| | | |
|---|---|---|
| EP | 1184143 A2 | 3/2002 |
| EP | 1914050 A1 | 4/2008 |
| GB | 2331041 | 5/1999 |
| JP | 07-132497 | 5/1995 |
| JP | 08-090493 | 4/1996 |
| WO | WO-8700794 | 2/1987 |

OTHER PUBLICATIONS

EPO Extended Search Report for European App. No. 09175337.6—dated Jun. 8, 2010.
*Sample making and short-run production tables: The Kongsberg XL-Series.* Esko Artwork, 2008. Retrieved Jun. 19, 2008. http://www.esko.com/webdocs/trap/080603103631/G2558368_kongsberg_xl_us.pdf.
*Automated digital finishing systems for signs and displays: Esko Kongsberg i-XL Series.* Esko Artwork, 2008. Retrieved Jun. 19, 2008. http://www.esko.cora/webdocs/trap/060113093347/G2558370_Kongsberg iXL_us .pdf.
*Digital cutting tables for heavy-duty applications: The Kongsberg XP Series.* Esko Artwork, 2008. Retrieved Jun. 19, 2008. http://www.esko.com/webdocs/trap/080606103206/G2558319_Kongsberg_XP_us.pdf.
*Kongsberg XE Series.* Esko Artwork, 2008. Retrieved Jun. 19, 2008. http://www.esko.com/webdocs/trap/080606115325/G2558380_Kongsberg_tables_us.pdf>.
EPO Search Report for European App. No. 09175337.6—dated Jun. 8, 2010.

AUTOMATICALLY REMOVING WASTE MATERIAL USING A STRIP DIE WHEN CUTTING A SHEET OF MATERIAL ACCORDING TO A PREDETERMINED PATTERN

RELATED APPLICATIONS

The present invention is a division of pending U.S. application Ser. No. 12/610,167 filed 30 Oct. 2009, to issue 26 May 2015 as U.S. Pat. No. 9,038,511. U.S. application Ser. No. 12/610,167 claims benefit of and is a conversion of U.S. Provisional Patent Application No. 61/113,784 filed 12 Nov. 2008. The contents of U.S. application Ser. No. 12/610,167 and 61/113,784, and of U.S. Pat. No. 9,038,511 are incorporated herein by reference.

FIELD OF THE INVENTION

The present invention relates generally to cutting of sheet material according to a pre-defined pattern, and to automatic removal of waste material therefrom.

BACKGROUND OF THE INVENTION

Containers, cartons, boxes, placards and the like are commonly formed from a planar substrate such as cardboard, although other material may be used. This invention relates to cutting of sheets of material which are one example of such planar substrates. When a sheet of material is cut out with a certain pattern, it leaves a lot of waste material on the cutting table which needs to be removed before the next sheet is cut. Removing of such waste material creates extra work and, in most cases, requires manual intervention. The present invention makes use of a female strip die which allows the waste material left over from cutting the sheet of material to fall through the cut outs of the female strip die or outside area of the die. This waste is collected by a container or by a waste transportation system.

Aspects of the present invention provide a method and a system for removal of such left over waste material with automated means.

SUMMARY OF THE INVENTION

The present invention makes use of a strip die over which is placed a cut piece of material such that waste material can be automatically removed from the cut sheet. In one apparatus embodiment, the invention includes a cutting table surface whereon sheet cutting occurs. Some apparatus embodiments include an in-stack region whereon sheets are stacked prior to being moved onto the cutting table region. Some embodiments further include a stripping station surface where the waste material is removed from the sheet using the strip die underneath the cut sheet and a removal tool. In one embodiment of the present invention, the cutting table and stripping station are adjacent to each other. In some embodiments, the apparatus preferably further includes an out-stack region whereon cut sheets after stripping are stacked for removal.

One method embodiment operates as follows. A pattern for the strip die is determined from a pre-determined pattern according to which the sheet of material is to be cut. The pattern for the female strip is determined such that the pieces of waste material fall as a result of the removing. The strip die is cut, e.g., on the cutting table using a transversely moveable cutting tool on a longitudinally moveable transverse rail. In one embodiment of the invention, the female strip die is moved to the stripping station surface, e.g., using a transverse rail mechanism. The strip die is fixed on the stripping station surface. The sheet of material is cut on the cutting table. If the waste area is large, some extra cut outs are added to larger areas outside the pattern so that pieces of waste material are relatively small. The sheet of material after cutting is moved to the stripping station, e.g., using the same or another transverse rail such that it is positioned exactly on top of the female strip die. A removal tool on the stripping station is controlled to remove the waste material from the sheet of material. This waste material is collected in the stripping station by a waste container or through a waste transportation system. After this process, the cut sheet of material is ready on top of the female strip die inside the stripping station. The ready sheet can be picked up directly from the stripping station or it can be moved to an out stack region using the same or another mechanism, e.g., the same or another transverse rail.

Particular embodiments includes a method of operating a cutting apparatus, the method includes determining a strip-die cutting pattern for cutting a strip die according a pre-determined pattern for a to-be-cut sheet of material, such that any material region in a sheet cut according to the pre-determined pattern has a shape similar to and larger than a corresponding area in a strip die cut according to the strip-die cutting pattern. The method further includes preparing a strip die according to the determined strip-die cutting pattern, positioning the strip die on a stripping station surface to a strip-die position, moving a to-be-cut sheet of material onto a cutting table surface, and cutting the to-be-cut sheet of material according to the pre-determined pattern, the cutting resulting in a cut sheet of material, including one or more final portions and one or more cut pieces of waste material. The method further includes moving the cut sheet of material to the stripping station surface positioned over the strip die at a pre-determined position relative to the strip-die position, removing the pieces of waste material from the cut sheet of material using a removal tool, and removing the removed waste material from the stripping station. As an example, in some embodiments, the strip-die cutting pattern is such that after the cut sheet of material is placed in an aligned manner over the female strip die, and the cut material is removed, there is no strip die material directly under any edge formed by a cut. Note that in some other embodiments, in some situations, at least one edge might have some insignificant amount of strip die material underneath, e.g., for support structures to keep otherwise disjoint parts of the female strip die together. This still is "substantially no strip die material directly under any edge."

Particular embodiments include an apparatus to cut a sheet of material according to a pre-defined pattern, and to automatically remove waste material using a strip die. The apparatus includes a cutting surface having a cutting area on which a sheet of material may be placed, a stripping station surface having a stripping area on which a strip die sheet of material may be placed, at least one tool holder mechanism able to controllably move a cutting tool over the cutting area and able to controllably move a removal tool over the stripping area, and a controller configured to control operation of the cutting tool and the removal tool. The controller is configured to cut a to-be-cut sheet of material according to the pre-defined pattern resulting in a cut sheet of material, including one or more final portions and one or more cut pieces of waste material. The controller is further configured to move the cut sheet of material to the stripping area over a strip die, the strip die positioned at a strip-die position on the stripping area and having strip-die pattern related to the pre-defined pattern, such that any material region in a sheet cut according to the pre-defined pattern has a shape similar to and larger than a corresponding area in the strip die, the cut sheet moving being to a pre-determined position relative to the strip-die position. The controller is further configured to remove the pieces of waste material from the cut sheet of material using the removal tool. As an example, in some embodiments, the strip-die cutting pattern is such that after the cut sheet of material is placed in an aligned manner over the female strip die, and the cut material is removed, there is no strip die material directly under any edge formed by a cut. Note that in some other embodiments, in some situations, at least one edge might have some insignificant amount of strip die material underneath, e.g., for support structures to keep otherwise disjoint parts of the female strip die together. This still is "substantially no strip die material directly under any edge."

Particular embodiments includes a non-transitory computer-readable medium having instructions encoded thereon that when executed by one or more processors of a processing system cause carrying out a method of operating an apparatus for cutting a to-be-cut sheet of material according to a pre-defined pattern. The apparatus includes a cutting surface having a cutting area on which a sheet of material may be placed; a stripping station surface having a stripping area on which a strip die sheet of material may be placed; and at least one tool holder mechanism be able to controllably move a cutting tool over the cutting area and be able to controllably move a removal tool over the stripping area. The instructions are configured, when executed to cut a to-be-cut sheet of material according to the pre-defined pattern resulting in a cut sheet of material, including one or more final portions and one or more cut pieces of waste material. The instructions are further configured, when executed to move the cut sheet of material to the stripping area over a strip die, the strip die positioned at a strip-die position on the stripping area and having strip-die pattern related to the pre-defined pattern, such that any material region in a sheet cut according to the pre-defined pattern has a shape similar to and larger than a corresponding area in the strip die, the cut sheet moving being to a pre-determined position relative to the strip-die position. The instructions are further configured, when executed to remove the pieces of waste material from the cut sheet of material using the removal tool. As an example, in some embodiments, the strip-die cutting pattern is such that after the cut sheet of material is placed in an aligned manner over the female strip die, and the cut material is removed, there is substantially no strip die material directly under any edge formed by a cut. Note that in some other embodiments, in some situations, at least one edge might have some insignificant amount of strip die material underneath, e.g., for support structures to keep otherwise disjoint parts of the female strip die together. This still is "substantially no strip die material directly under any edge."

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF EXAMPLE EMBODIMENTS

As will now be described, features of the present invention include automatic removal of waste material in a cutting apparatus after cutting by using a female strip die.

Figure 1A:
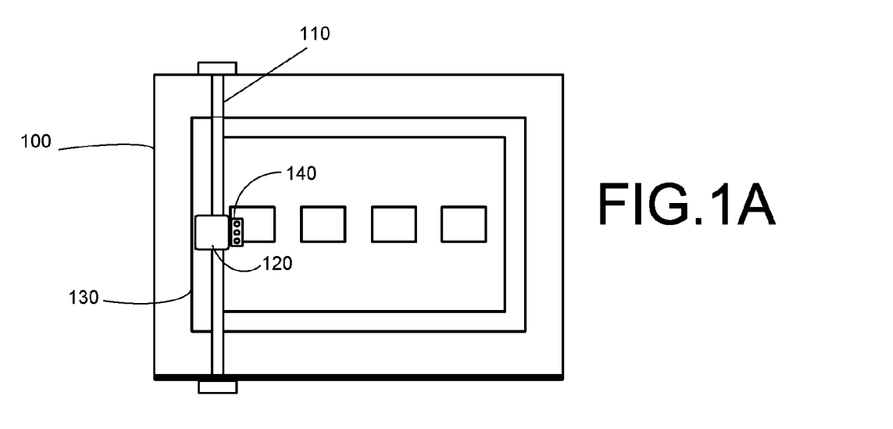
FIG. 1A-1C show different stages in operation of an embodiment of the invention, including a sheet of material to be cut on a cutting table, a sheet of material to be cut laid on top of a female strip die, and the sheet of material after the cutting and removing waste.

FIG. 1A depicts in a very simplified form a flat sheet of material 130 which is to be cut according to a pre-determined pattern on a cutting table station that includes a substantially flat surface 100. The cutting station includes a tool holder 120 that in this embodiment is a cutting tool holder. In one embodiment, the cutting tool is a knife. A cutting tool other than a knife or even a combination of more than any type of cutting tool may be used in different versions, e.g., a laser cutting tool, a plasma cutting tool, a cutting tool that cuts using milling, and so forth. The term "cutting tool" is meant to cover all such tools for cutting. The tool holder 120 in one embodiment is slideably movable by a drive mechanism along a transverse rail 110 that is oriented in what we call the transverse direction, the movement under control of a controller that in one embodiment includes a processing system. The transverse rail 110 is slideably moveable in a longitudinal direction perpendicular to the transverse direction by the drive system under control of the controller. In this manner, the tool holder 120 and any tools thereon can reach any point in a working area on the surface 100. The tool mechanism is able to move a particular tool, e.g., a cutting tool up and down from or to a non-cutting position to or from a cutting position.

Figure 1B:
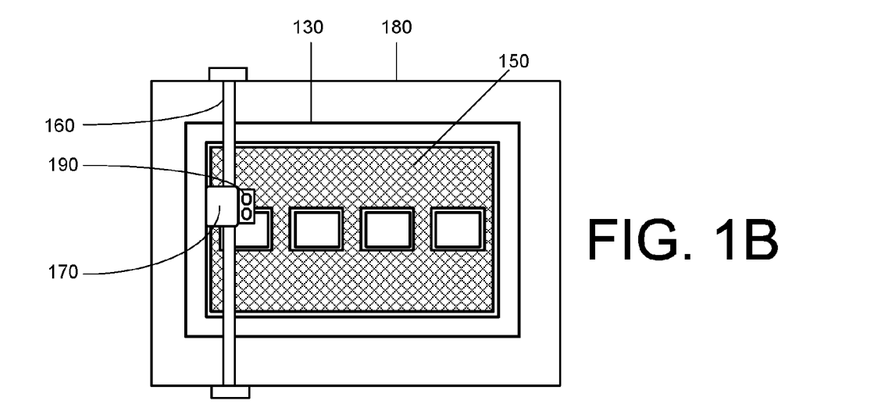

One embodiment of the present invention uses a female strip die 150 which is cut, e.g., on the same cutting table station with surface 100, or on another cutting table, according to a pre-defined pattern by using the transverse rail 110 and a cutting tool 140, e.g., a knife or other cutting implement on the tool holder 120. Once the female strip die 150 is cut on the cutting table surface 100, it is moved to the stripping station that also has a horizontal surface 180 as shown in FIG. 1B and is fixed, e.g., by its own weight, or adhesively, or by vacuum or by clamping on the stripping station surface 180. The stripping station includes a substantially flat surface 180, and a tool holder 170 slideably movable in the transverse direction along a transverse rail 160. The transverse rail is movable along the longitudinal direction such that the tool holder can be moved by a drive mechanism, e.g., the same drive mechanism as for the cutting table station with surface 100, under control of a the controller, e.g., the same controller as for the cutting table station.

In one embodiment, the female strip die 150 is made from a sheet of material 130 on the cutting table. The material can be any suitable material, and in one embodiment, is the same material from which the cuts are to be made, e.g., from cardboard stock in the case the cutting table is used for cutting cardboard for use in fabricating boxes.

The female strip die 150 is cut according to the a strip-die cutting pattern that is similar to the pre-determined pattern for cutting the stock material, except that the area of any material region is made smaller such that when the stock material is placed in an aligned manner over the female strip die 150, and the cut material is removed, there is substantially no female strip die material directly under any edge formed by a cut. Note that in some other embodiments, in some situations, at least one edge might have some insignificant amount of strip die material underneath, e.g., for support structures to keep otherwise disjoint parts of the female strip die together. This still is "substantially no strip die material directly under any edge." This is illustrated further below with the aid of FIGS. 8A-8D.

Returning to FIG. 1A, consider now a sheet of material 130 on the cutting table surface 100 being is cut (and possibly scored) according to a cutting pattern. The cutting pattern was also used for cutting the female strip die, but was modified for the cutting of the female strip die 150. The female strip die is designed in size and form so that the waste material can be removed from the cut sheet. For example, the strip die might cover a smaller area than a material cut according to the original pattern.

Figure 1C:
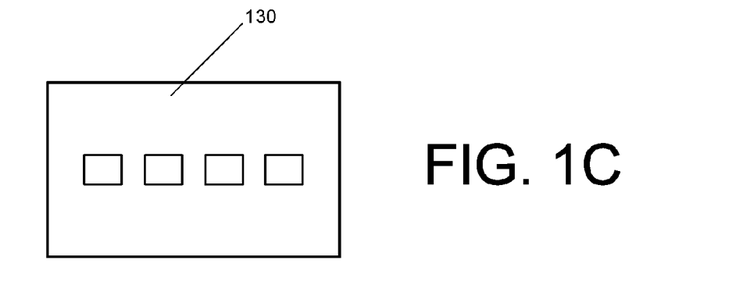

Once the material is cut, it is moved to the stripping station surface 180 positioned on top of the female strip die 150 that is already on the stripping station surface 180. This is shown in FIG. 1B. In one embodiment, the tool holder 170 on the transverse rail 160 includes a removal tool 190. The controller is configured to cause the removal tool 190 to move in a pre-defined sequence to a set of pre-defined positions situated on top of waste material locations. The removal tool can move up and down at any position under control of the controller. At each of the pre-defined positions, the controller is programmed to cause the removal tool 190 to remove waste material which can be collected by a waste container (not shown in FIG. 1B) inside the stripping station that has surface 180. After the removing the waste material, a final product with the cut outs as shown in FIG. 1C is available on top of the female strip die 150 on the stripping station surface 180. Such a product can then be removed, leaving the strip die 150 on surface 180, and the operation continued with a new cut sheet of material moved to the stripping station surface on which the strip die 150 is located. The details of the cutting system are explained further herein below.

Figure 2:
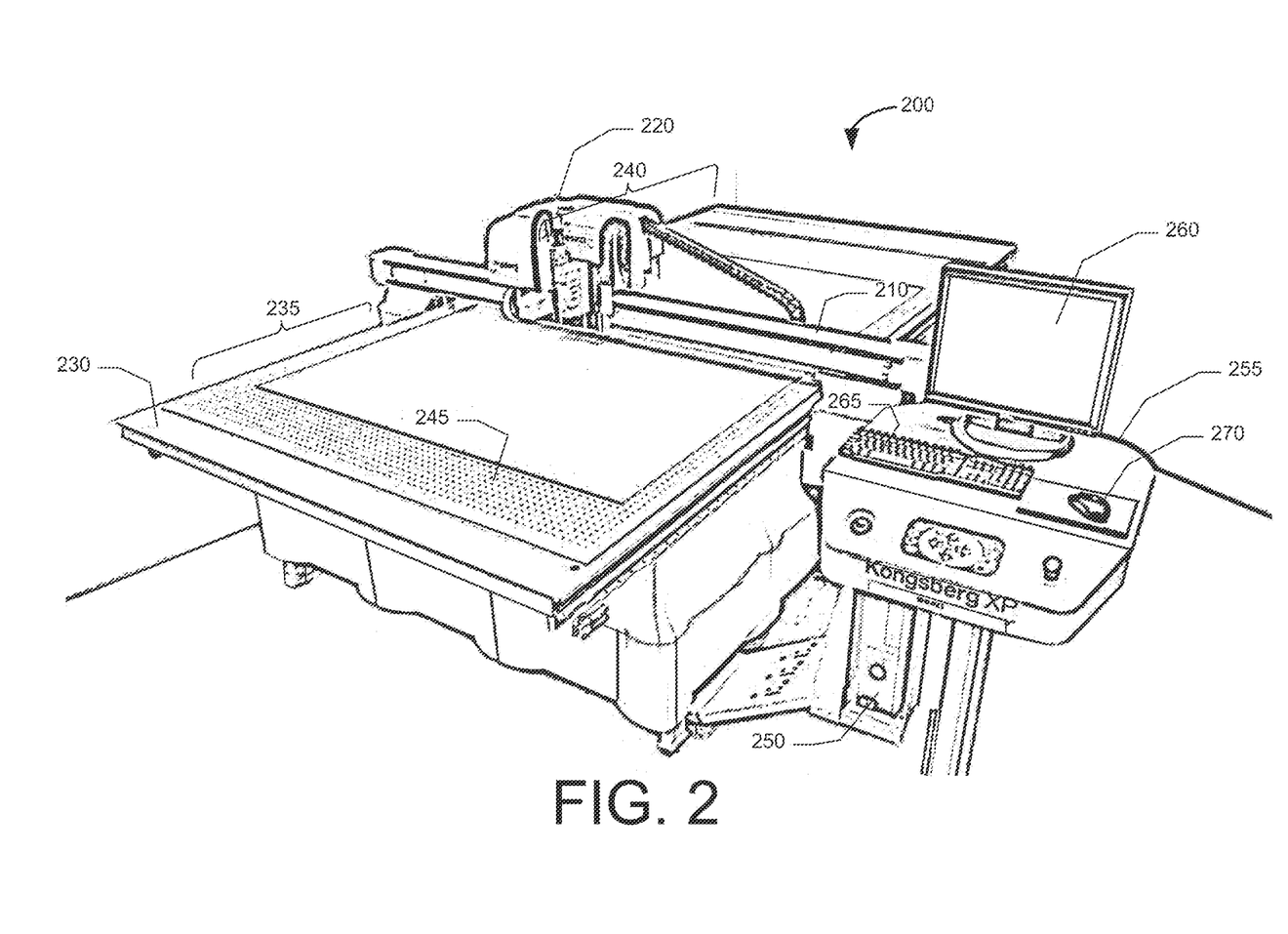
FIG. 2 depicts in perspective view a cutting table apparatus with a single transverse rail and tool holder according to an embodiment of the present invention.

FIG. 2 depicts in perspective view a cutting table apparatus 200 with a single transverse rail 210 and tool holder 220 according to an embodiment of the present invention. The apparatus 200 includes a substantially flat surface 230 which has both a cutting surface 235 and a stripping surface 240. The surfaces 230 include vacuum holes 245 that are switchably coupled to a source of vacuum, such that when vacuum is switched on to be applied to the holes, substantially flat material that is placed on the surface remains attached thereto until vacuum is switched off. The system 200 includes a computer system 250 that has an operator console 255 with a display screen 260, a keyboard 265, and a pointing device 270 such as a mouse. The processing system 250 is programmed, e.g., by executable instructions stored in a storage device such as memory and disk storage to control the operation of the system.

The system 200 shown in FIG. 2 has a single tool holder 220 that can selectively hold a cutting tool, one or more vacuum suction cups to grab material to move from the cutting surface 235 to the stripping surface 240, and a removal tool to remove waste material after cutting and material with cuts is at the stripping surface on top of the female strip die.

Figure 3:
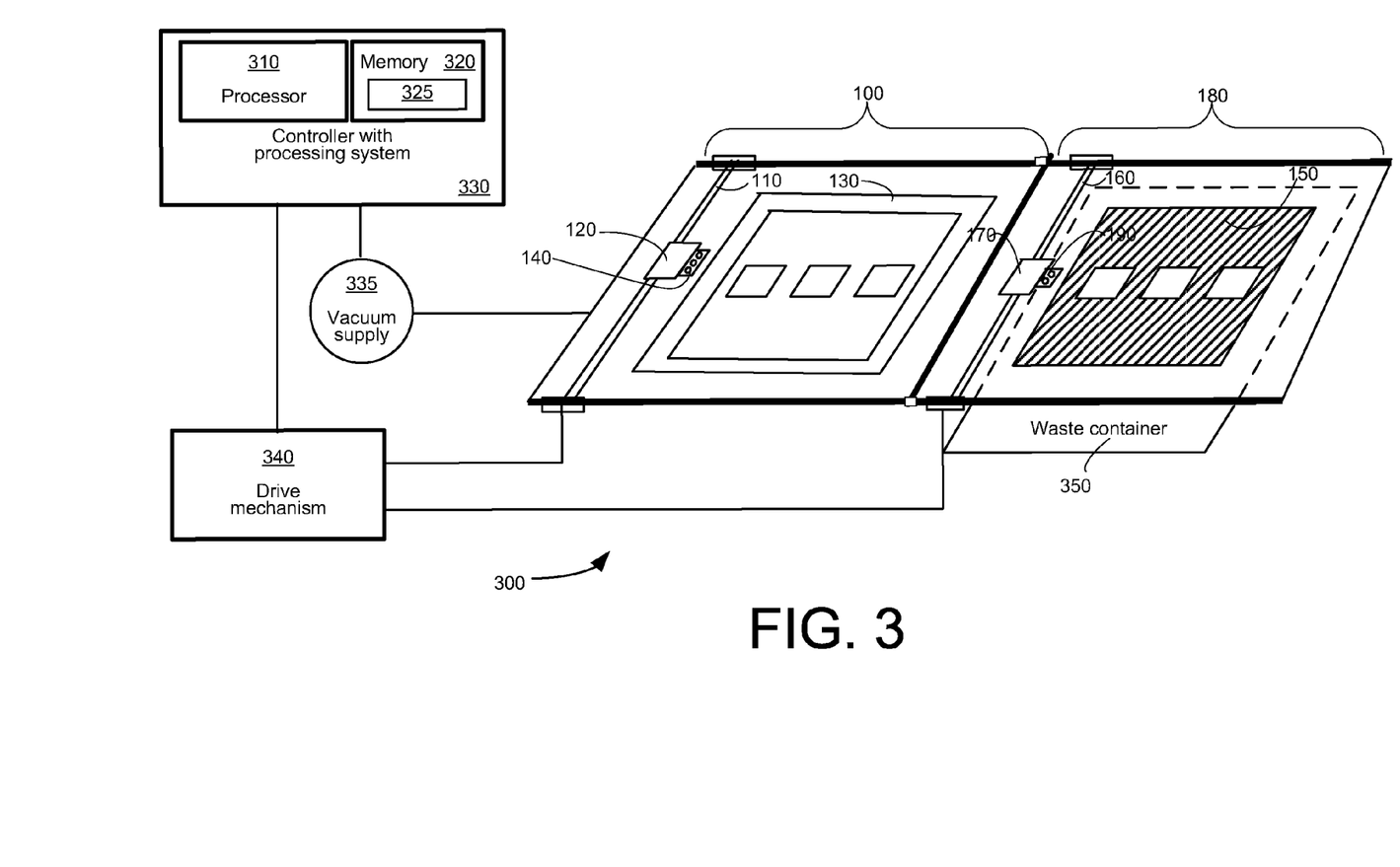
FIG. 3 depicts a simplified block diagram of an apparatus embodiment of the present invention including a cutting station surface and a stripping station surface shown in simple perspective view, a controller to control the overall function, a drive mechanism, and a vacuum source.

FIG. 3 depicts in simplified form an apparatus 300 for cutting sheets of material, according to an embodiment of the present invention. The apparatus 300 includes a cutting table station surface 100, a stripping station surface 180 shown in perspective view. The apparatus 300 also includes a controller that in one version includes a processing system 330 including at least one processor 310 and a storage subsystem shown for simplicity as a memory 320. The memory 320 includes instructions 325, e.g., a computer program that when executed by the processor 310 cause the apparatus to carry out a set of method steps as described herein. In particular, the controller is programmed to control the various movements of the elements of the apparatus 300 as described herein.

The apparatus 300 includes each of surfaces 100 and 180 having its own separate tool holder. The surfaces 100 and 180 are each substantially flat and extend in longitudinal direction and transverse direction that is perpendicular to the longitudinal direction.

Having two separate surfaces for cutting and stripping each with its own tool provides for stripping one piece of material while the next one is being cut.

The surface 100 includes a transverse rail 110 with a tool holder 120 that is slideably movable in the transverse direction under control of the controller 330. The transverse rail 110 is movable in the longitudinal direction on the cutting table station surface 100. The tool holder can thus move under control of the controller 330 to any location in a working area within the surface 100. In one embodiment of the present invention, the tool holder 120 includes a cutting tool 140 to make the cut outs in a sheet of material 130 that is positioned on the cutting table area 100. One embodiment includes vacuum holes or grooves on the surfaces 100 and 180, and a vacuum supply 335 coupled to the vacuum holes or grooves. The vacuum supply 335 to the vacuum holes or grooves can be switched on or off under control of the controller 330, such that the sheet of material 130 can be attached to the surface.

The stripping station surface 180 as shown in FIG. 3 includes its own transverse rail 160 with another tool holder 170 slideably movable along the transverse rail 160. In one embodiment of the present invention, the tool holder 170 includes a removal tool 190 to remove waste material from a sheet that has been cut in the cutting table area 100. In another embodiment of the present invention, the tool holder 170 also includes suction cups switchably coupled to the vacuum supply 335 under control of the controller 330, such that a sheet of material on the cutting table area 100 can be grabbed, lifted, and transported to the stripping area 180 under control of the controller 330.

A drive mechanism 340 is included, and causes the transverse motion of each of the transverse rails 110, 160 and of each of the tool holders 120, 170. The details of the drive mechanism are not shown in FIG. 3 to not obscure the inventive features. The tool holder is configured such that any tool on any of the tool holders can be selectively lifted up or down under control of the controller system 330.

The operation of the system is as described above with reference to FIGS. 1A-1C. The waste material removed is collected in one embodiment in an included waste container 350 that is located under the stripping surface 180.

Figure 4:
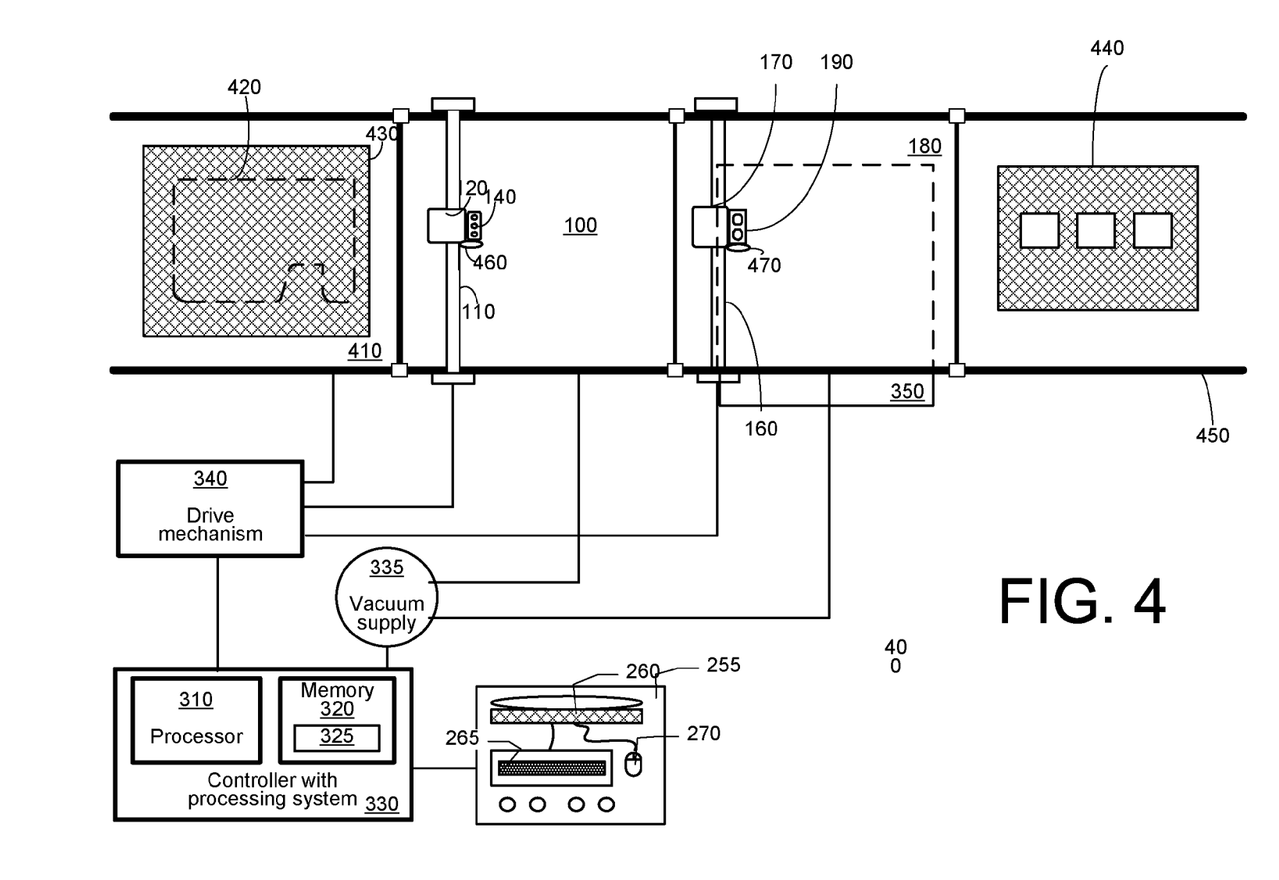
FIG. 4 depicts a plan view of an automated apparatus that includes a loader to a cutting surface, a stripping surface, and an area for completed cut sheets according to an embodiment of the present invention.

FIG. 4 is a plan view of an alternate embodiment of an automated cutting and stripping apparatus 400. Apparatus 400 includes an in-stack region 410 whereon a vertical stack of horizontally oriented sheets 430 is placed. Also included is a sheet moving mechanism configured to move a to-be-cut sheet to a cutting position on the cutting surface. The sheet moving mechanism may be the same mechanism used to cut the sheet, or a separate sheet moving mechanism. In one embodiment, the in-stack region includes a lift table 420 shown in broken lines under the sheets. The lift table 420 is moveable up and down by a portion of a drive mechanism 340 under control of a controller 330 such that the stack can move up one sheet material thickness after each sheet is removed from the stack. Note that elements that are similar in function to elements in the apparatus 300 of FIG. 3 (and to FIGS. 1 and 2) have like reference numbers, even though the elements would not be identical. For example, the drive mechanism in each of FIGS. 3 and 4 have reference numeral 340; those skilled in the art would understand, of course, that the drive mechanism of the embodiment of FIG. 4 would have additional elements that deal with the in-stack region. Similarly, the controller has reference numeral 330 in both drawings, even though they are not identical in function.

Coupled to the controller 330 is an operator console 255 with a display screen 260, a keyboard 265, and a pointing device 270 such as a mouse. The control system together with the load table and a moving member that includes vacuum suction cups is configured to move each sheet from the top of the vertical stack to the cutting table station surface 100. In one embodiment, moving of the sheet and the aligning of the cutting is carried out by using a transport system as described in U.S. Pat. No. 7,182,007 to inventors Berge et al. titled "Method for dynamically aligning substrates bearing printed reference marks and codes for automated cutting or scoring, and substrates so cut or scored." The contents of U.S. Pat. No. 7,182,007 are incorporated herein by reference.

The surfaces include vacuum holes or grooves supplied by a vacuum supply 335 that is controlled by the control system 330.

A tool holder 120 for the cutting station area 100 includes a cutting tool tip, e.g., a knife tip that projects controllably into the sheet, or some other cutting implement. Assuming for illustrative purposes that the cutting tool includes a knife tip, movement of the knife tip to trace the cutting lines (cut-line) in or through a sheet occurs under the control of processing system 330 to cut the sheet of material according to a predetermined pattern. In one embodiment, after sheet cutting is complete, a check of the knife is carried out by lifting the tip of the knife from the surface and moving the knife over a measuring pad 460 and lowering the knife to the measuring pad 460 to ensure that the knife blade is still intact. This check of knife blade integrity can be carried out within a relatively short time period, e.g., a second or so.

The stripping station surface 180 is similar to that of FIG. 3. A measuring pad 470 is included in the surface 180. In one embodiment, after stripping is complete, the tip of the removal tool is lifted and moved to be over measuring pad 470, and then moved downwards onto the measuring pad 470 to ensure that the tip is still intact.

The storage subsystem (shown as memory 320) of the control system 330 includes the instructions 325 that when executed by the processor(s) 310 of the controller carry out the method steps described herein. The storage subsystem in one embodiment also contains the predefined pattern (as a cutting plan) for the female strip die 150 and also the predefined pattern for the sheets to be cut.

The embodiment of FIG. 4 includes a finished sheet area 450, called an out-stack region, onto which completed cut sheets are moved under control of the controller 330.

The operations of the moving from the stack, cutting, moving to the stripping area, stripping, and moving onto the area 450 occur in one embodiment as a pipeline, and operations occurring at each area in parallel.

Figure 5A:
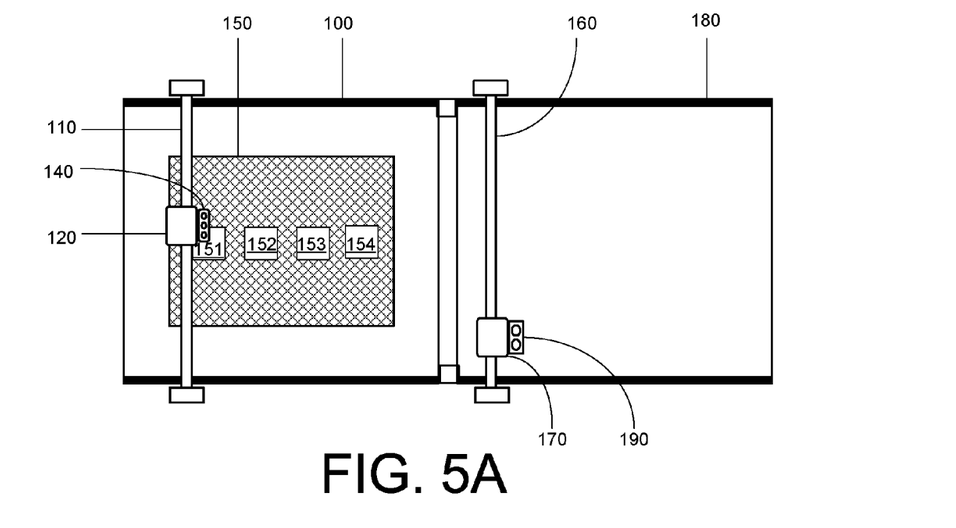
FIGS. 5A-5D depict in simplified form the result of different method steps of using the cutting table surface and stripping station surface according to an embodiment of the present invention.
Figure 5B:
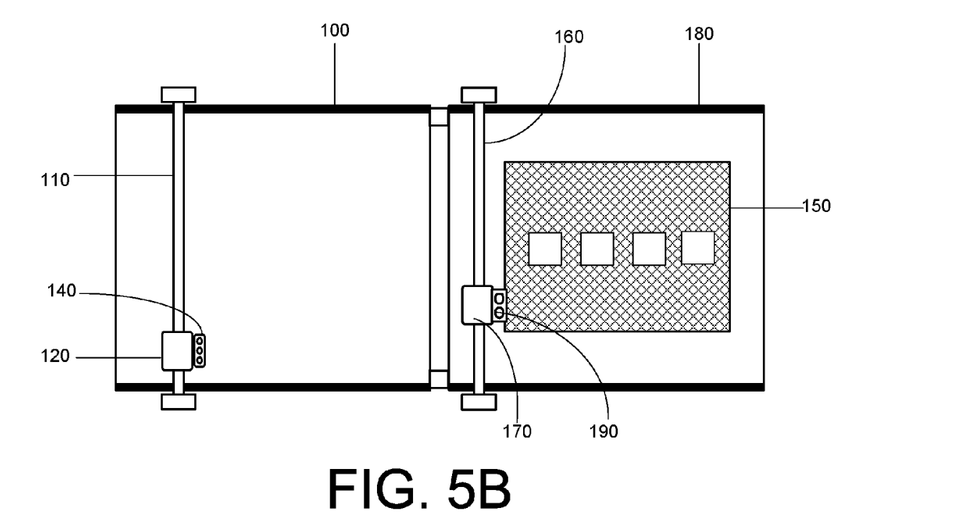
Figure 5C:
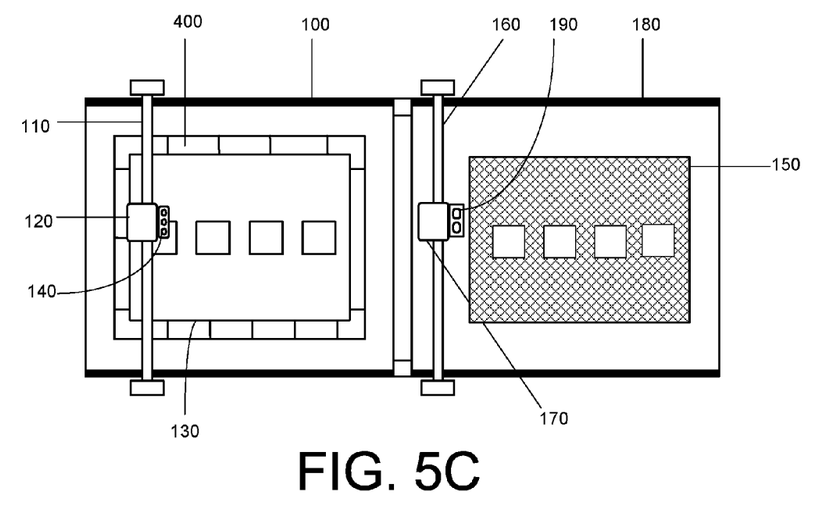
Figure 5D:
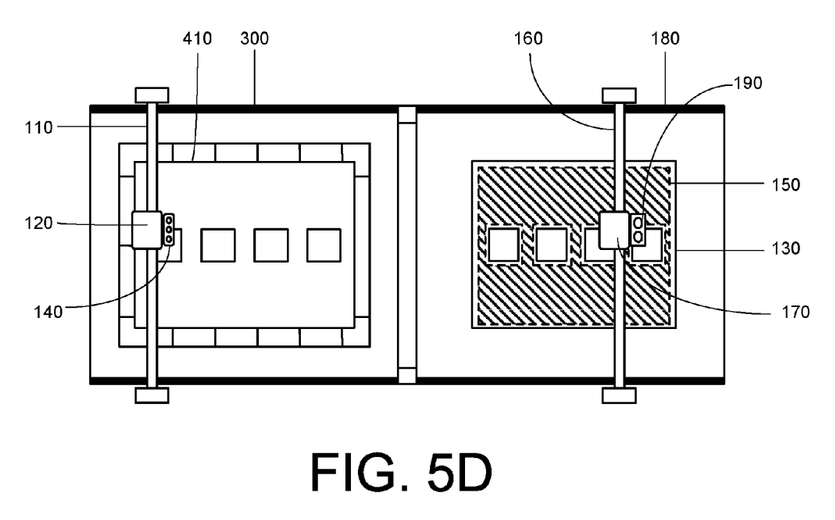
Figure 6:
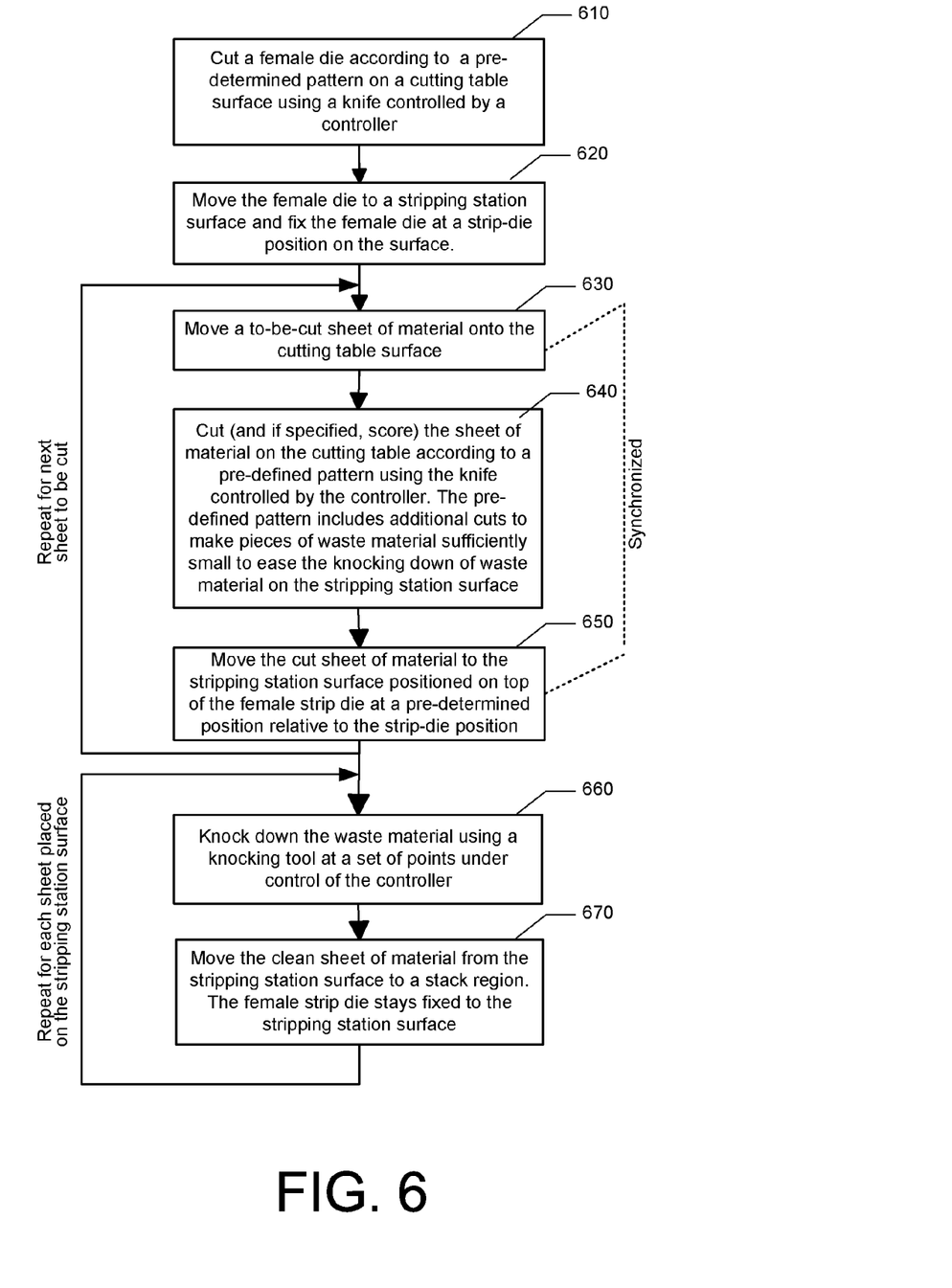
FIG. 6 depicts a flow chart of steps in the operation of a cutting and stripping apparatus according to an embodiment of the present invention.

FIGS. 5A-5D and the simplified flowchart of FIG. 6 describe the various steps of one embodiment of the invention, and are applicable to the cutting surface 100 and stripping surface 180 of the embodiments of any of FIG. 3 or 4. The process steps of FIG. 6 are carried out under control of the control system 330. In one embodiment, the control system includes a processing system including a non-transitory storage medium, e.g., in the form of memory 320, such a term used herein to include disk storage, optical storage, and other storage medium types singly or in combination. In some embodiments, the processing system includes a single processor, while in others, more than one processor are included. The memory 320 includes instructions 325 that when executed by the processor(s) of the processing system cause carrying out of the method steps of FIG. 6.

As illustrated in FIG. 5A and shown in FIG. 6, initially, in 610, a sheet of material for use as a female strip die 150 is placed on the cutting table surface 100. In one embodiment of the present invention, the same material can be used to produce the female strip die as used for the sheets of material to be cut, e.g., for making cartons. The processor 310 on the computer system 330 executes the program instructions to control the drive mechanism 340 such that the transverse rail 110 and the cutting tool 140 move on the cutting table 100 according to the pattern to be cut. The pre-defined pattern of the female strip die 150 is in one embodiment a contraction of the cuts of the pre-defined pattern for the sheets. For example, any cutouts in the sheets of material are larger in the pre-defined pattern of the female strip die. Strip die 150 shown in FIG. 5A includes four such cutouts 151, 152, 153, and 154.

As shown in FIG. 5B and in 620 of FIG. 6, after the female strip die 150 is cut, the female die is moved to stripping station surface 180, e.g., using suction cups on the transverse rail 160 of the stripping surface 180, or by some other means. The female strip die is fixed onto the stripping surface 180. In one embodiment of the present invention, female strip die 150 is fixed on the stripping station surface 180 by using an adhesive. In another embodiment, the surface 180 includes vacuum grooves or holes, and the strip die is kept on the surface 180 by turning on a vacuum source to the grooves or holes.

As shown in FIG. 5C and in 630 of FIG. 6, a sheet of material to be cut is moved to the cutting table station surface 100, e.g., using the transport system in the case of the embodiment of FIG. 4, or otherwise. As shown in 640 of FIG. 6, the cutting tool 140 in the tool holder 120 moves to a set of positions determined according to a pre-defined pattern under control of the controller 330 to cut the sheet of material according to a pre-defined pattern. In some patterns, scoring also might be included. In one embodiment, additional cuts are added to areas that are relatively large to make the removing easier later on in the stripping station 180. Such additional cuts are calculated, e.g., on the controller's processor(s), from the pre-defined pattern.

Once the sheet of material is cut (and possible scored), as shown in 650 of FIG. 6, the cut sheet is moved to the stripping station surface 180, e.g., using suction cup on the transverse rail 160 as controlled by the controller 330, or otherwise. In the stripping station area, the cut sheet is positioned exactly on top of the female strip die 150 as controlled by the controller 330.

As soon as the cutting table area 100 is clear, the next sheet can be moved (step 630) and the cutting process repeated for the next sheet.

In one embodiment, as the next sheet is being moved to the cutting table surface, and cut, the stripping operations are carried out in a pipeline manner. In another embodiment, e.g., an embodiment that includes only a single tool holder, such as shown in FIG. 2, the stripping operations occur sequentially after the cutting operating and not simultaneous with the cutting of the next sheet.

As shown in 660 of FIG. 6, the controller controls the drive mechanism to move the transverse rail 160, the tool holder 170 and a removal tool 190 on the tool holder to move to a set of locations that are determined to match the cut pattern to remove the waste material. For example, in the case additional cuts are made to reduce the size of waste material, a number of known-down locations are determined for removing the waste material. The removed waste material within and around the pattern of the sheet of material falls as a result of removing and is collected by a waste container 350 in the stripping station 180.

FIG. 5D shows a sheet of material 130 over the strip die 150 after the removing.

As shown in 670 of FIG. 6, the clean sheet of material is moved from the stripping station surface to a stack region. The female strip die stays fixed to the stripping station surface.

In the embodiment that includes pipelining, the timing of the moving 670 of the clean sheet away from the stripping station surface 180 and the moving 630 of a to-be cut sheet to the cutting area 100 (from the stack in the case of the embodiment of FIG. 4) are synchronized as shown in FIG. 6. The removing (stripping) 660 and moving 670 operations occur while the to-be cut sheet is being cut.

It is useful at this juncture to describe an exemplary processing system 330 used in one embodiment of the present invention to control the cutting and stripping of the sheets of material. Referring to FIG. 3, front-end processing system 330 includes a processor 310 and a memory 320. Stored or loadable into memory 320 is a software program (instructions) that when executed by processor(s) 310 cause method steps such as shown in FIG. 6 to be carried out.

Figure 7A:
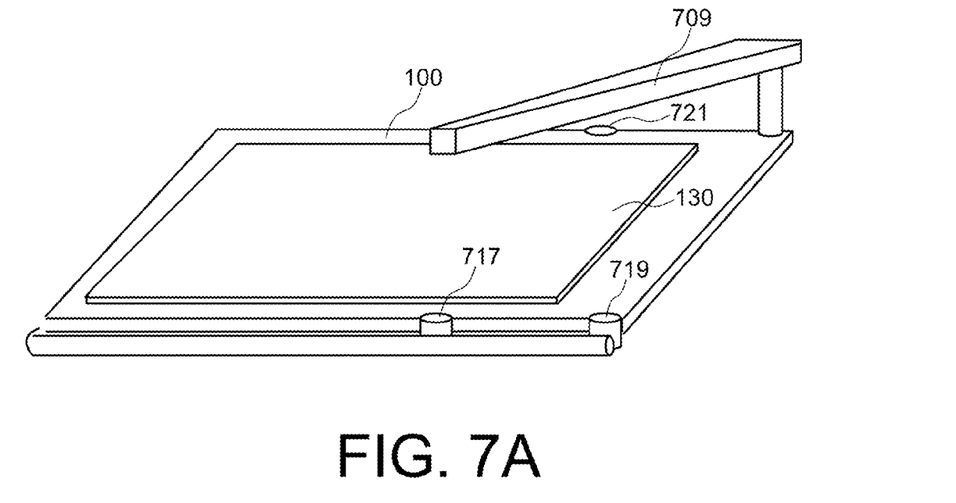
FIGS. 7A and 7B show two views of an alternate embodiment of a loading mechanism to move a sheet of material to or from a surface.
Figure 7B:
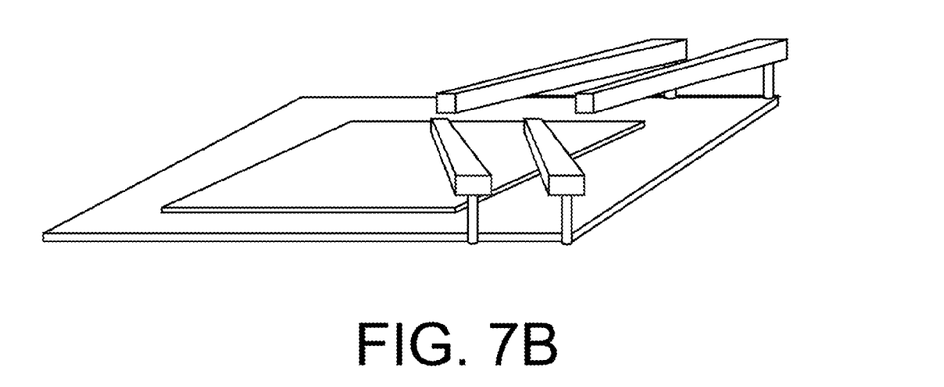

While the moving of the sheet may be accomplished by a system such as described in U.S. Pat. No. 7,182,007, or in an alternate embodiment, by pick-up suction cups on the tool holders 120 and 170, yet another alternate embodiment includes a set of robotic pick-up arms. FIGS. 7A and 7B show one such example on one surface. Those in the art would understand that a complete system would include a sufficient number of arms located at sufficient number of locations. Suppose the surface is the cutting surface 100. Each arm rotatably coupled to the table surface 100, either by a direct rotatable connection to the table surface 100, or, in another embodiment, by a rotatable connection to a base to which the table surface 100 is connected. The apparatus further includes a video detection system that in one embodiment includes a video camera on each pick-up arm. Each pick up arm has a pick-up mechanism that includes at least one suction cap coupled to the vacuum system 335. One pick-up arm 709 is shown in FIG. 7A. In this embodiment, three other pick-up arms are located at locations 717, 719, and 721. FIG. 7B shows all four pick-up arms. The video camera of each pick-up arm is interfaced to the controller 330 to provide an optical recognition system for a set of locations.

The suction cups of the pick up arms are movable towards or away from the cutting area under control of the controller. In this manner, under control of the controller, the suction cups of the robotic pick-up arms may be positioned to be on top of a desired location on the cutting area on which a sheet of material is placed, and lowered to make contact or almost make contact with surface. The vacuum can then be turned on (under control of the controller) so that the pick-up mechanism's suction cap attaches itself to any sheet of material on the cutting area. Using the pick-up arms thus provides a mechanical pick-up system that can pick up by using a plurality of suction cups at a plurality, e.g., up to four locations. The vacuum applied to the loading table's vacuum holes is selected to be low enough relative to the vacuum used on the arms' suction cups so that a set of suction cups applied to a sheet of material can remove the sheet from the cutting table area in order to be moved to the stripping area.

One embodiment includes a mechanism is coupled to each arm's pick-up mechanism to move the pick-up mechanism towards or away from the cutting table area under control of the computer system. In some embodiments, this mechanism is pneumatic. In another embodiment, it is hydraulic. In yet another embodiment, it is electric. Thus the controller 330 can direct the video cameras and the suction cups of the pick-up arms to a set of locations on the cutting surface 100. In one embodiment, positioning the arm is relative to the cutting table surface that provides a frame of reference.

While the stripping station is shown to have a planar surface, in some embodiments, the stripping station includes support bars with gaps between the bars, so that waste material can fall between the support bars by the removal tool, which is configured to known down the waste material.

In general, the strip-die cutting pattern is such that after the cut sheet of material is placed in an aligned manner over the female strip die, and the cut material is removed, there is substantially no strip die material directly under any edge formed by a cut. There may be some female strip die patterns that are made up of portions that are not joined. In such cases, there is a need to include support portions that hold the otherwise disjoint portions together. Having such support bars still meets the "substantially no female strip die material underneath any edge" condition. That is, "substantially no female strip die material" includes the case of "no strip die material other than support portions that hold the otherwise disjoint portions of the female strip die together."

Figure 8A:
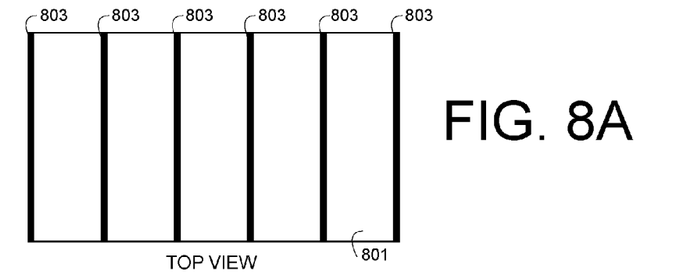
FIGS. 8A-8D illustrate a situation in which a strip-die cutting pattern is such that after the cut sheet of material is placed in an aligned manner over the female strip die, and the cut material is removed, there may still be some strip die material directly under some edges formed by a cut, according to an embodiment of the present invention. The amount of strip die underneath is so insignificant that there is still substantially no strip die material under any edge after cutting.
Figure 8B:
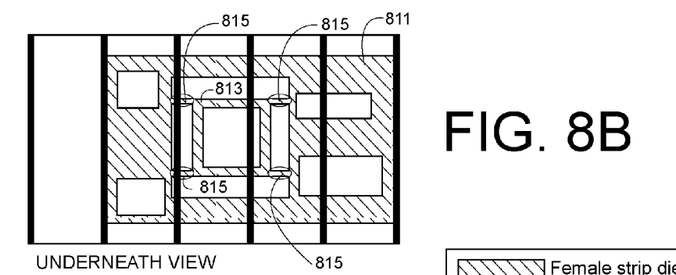
Figure 8C:
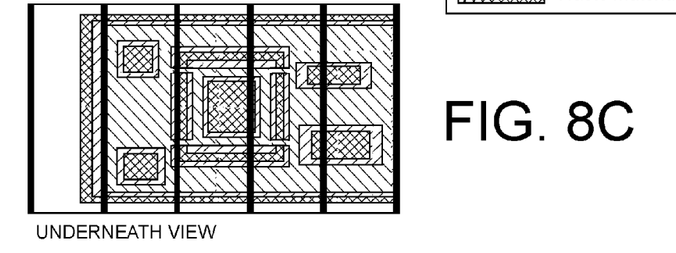
Figure 8D:
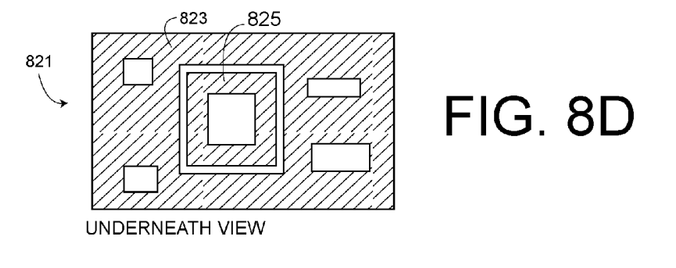

FIGS. 8A-8D illustrate such a situation in which a strip-die cutting pattern is such that after the cut sheet of material is placed in an aligned manner over the female strip die, and the cut material is removed, there may still be some strip die material—that of support structure(s)—directly under some edges formed by a cut, according to an embodiment of the present invention. FIG. 8A shown a stripping station 801 with bars 803. FIG. 8B shows a view from underneath showing the stripping station with a female strip die on it, according to an embodiment of the present invention. FIG. 8C stripping station with the support bars, the strip die, and a cut sheet seen from underneath according to an embodiment of the present invention. FIG. 8D shows the final cut and stripped sheet 821 after the waste material has been removed.

Referring to FIG. 8D, note that the final cut sheet 821 includes two disjoint portions, a first portion 823 having at least one void, and a second portion 825 within a void of the first portion. For such a situation, the strip die pattern, as seen in FIG. 8B, includes two portions 811 that is underneath the first portion 823, and a second strip die portion 813 that is underneath the second portion 825. These strip die portions 811 and 813 would be disjoint were it not for included support structures 815 shown within small ellipses in FIG. 8B. Because of these support structures, as seen in FIG. 8C, not all edges of the cut material after cutting have no female strip die material underneath. However, there is substantially no female strip die material underneath any edge of the cut material. These support structures take up insignificant amounts of the perimeter of any strip die portion.

The cutting apparatus embodiments described herein include a transverse rail that is moveable in the longitudinal direction under control of a controller, with a toolholder holding moveable in the transverse direction along the bar under control of the controller, so that the cutting tool can be moved to any location in a plane along a cutting surface. In alternate embodiments, other mechanisms for moving a cutting tool in the plane of a sheet of material are used. One such embodiment uses one or more robotic arms. Another embodiment causes the planar surface with the sheet of material thereon to move in one or more directions. The inventive aspects described herein do not depend on any particular technology for carrying out the cutting. A cutting tool that includes a traditional knife blade also is not necessary, and other methods of cutting may be used in alternate embodiments. For example, laser cutting or plasma cutting may be used.

Furthermore, while one application envisaged is for cutting cardboard or similar material used for packaging, the invention can also be used in an apparatus designed for cutting any other material in sheet form. Thus, embodiments of the invention can be used to cut cardboard, metal, wood, plastic sheeting, foam, laminates, composites, and so forth.

In summary it is seen that aspects of the present invention provide an automated method of removing the waste material from a cutting system using the apparatus described herein. The female strip die used for waste removal may be produced on the same cutting table where the sheets of material are cut. The removal tool removes the waste material automatically under the control of a controller, e.g., that has a processing system and the removed waste material is collected by a waste container. The final product is available on top of the female strip die inside the stripping station.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A processing system as used herein is synonymous with a "computer," a "computer system," or a "computing machine" or a "computing platform" and may include one, or more than one processors.

Note that when a method is described that includes several elements, e.g., several steps, no ordering of such elements, e.g., steps is implied, unless specifically stated.

In some embodiments, a non-transitory computer-readable storage medium is configured with, e.g., encoded with instructions that when executed by one or more processors of a processing system, to cause carrying out a method of removing waste material as described herein.

Thus, the methodologies described herein are, in some embodiments, performable by one or more processors that accept logic, e.g., computer-readable (also called machine-readable) instructions encoded on one or more computer-readable media. When executed by one or more of the processors, the instructions cause carrying out at least one of the methods described herein. Any processor capable of executing a set of instructions (sequential or otherwise) that specify actions to be taken are included. Thus, one example is a typical processing system that includes one or more processors. Each processor may include one or more of a CPU or similar element, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term storage device or memory unit as used herein, if clear from the context and unless explicitly stated otherwise, also encompasses a storage system such as a disk drive unit. The processing system in some configurations may include a sound output device, and a network interface device. The memory subsystem thus includes a non-transitory computer-readable medium that is configured with, e.g., encoded with instructions, e.g., logic, e.g., software that when executed by one or more processors, causes carrying out one or more of the method steps described herein. The software may reside in the hard disk, or may also reside, completely or at least partially, within the RAM and/or within the processor during execution thereof by the computer system. Thus, the memory and the processor also constitute a non-transitory computer-readable medium on which are encoded instructions.

Furthermore, a non-transitory computer-readable medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a non-transitory computer-readable medium configured with a set of instructions, e.g., a computer program when executed on one or more processors, e.g., one or more processors that are part of controller, causes carrying out of method steps. Thus, as will be appreciated by those skilled in the art, embodiments of the present invention may be embodied as a method, an apparatus such as a special purpose apparatus, an apparatus such as a data processing system, or a non-transitory computer-readable medium, e.g., as a computer program product. The non-transitory computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of non-transitory computer-readable medium, e.g., a computer program product on a non-transitory computer-readable medium with computer-readable program code embodied in the medium.

While the non-transitory computer-readable medium is shown in an example embodiment to be a single medium, the term "non-transitory computer-readable medium" should be taken to include a single medium or multiple media, e.g., a centralized storage device for a centralized database, or distributed storage for a distributed database, and/or associated caches and servers that store the one or more sets of instructions.

A non-transitory computer-readable medium is any computer-readable medium that is statutory subject matter under the patent laws applicable to this disclosure, including Section 101 of Title 35 of the United States Code. A non-transitory computer-readable medium is, for example, any computer-readable medium that is not specifically a transitory propagated signal or a transitory carrier wave or some other transitory transmission medium, and is otherwise any tangible storage medium that is capable of storing or encoding instructions for execution by one or more of the processors and that cause the one or more processors to perform method steps of any one or more of the methodologies of the present invention. A non-transitory computer-readable medium may take many forms, including but not limited to, non-volatile media and/or volatile media. Non-volatile media includes, for example, optical storage, magnetic disks, and/or magneto-optical disks. Volatile media includes dynamic memory, such as main memory. For example, the term "non-transitory computer-readable medium" shall accordingly be taken to included, but not be limited to, in one set of embodiment, a solid-state memory, or a computer software product encoded in computer-readable optical or magnetic media.

In one embodiment, some or all of the computer-readable instructions, or just the data part, e.g., describing the pattern are encoded, e.g., using optical barcode or 2D optical code by printing a coded region on the substrate. Such printing may be combined with one or more reference marks used for optical alignment. Such cutting may include scoring, e.g., for fold lines. In one embodiment, the reference marks, and the process of aligning relative to the reference marks is as described in above-mentioned U.S. Pat. No. 7,182,007.

It will be understood that the steps of methods discussed are performed in one embodiment by an appropriate processor (or processors) of a processing (i.e., computer) system executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference. In the case the Patent Rules or Statutes do not permit incorporation be reference of material that itself incorporates information by reference, the incorporation by reference of the material herein excludes any information incorporated by reference in such incorporated by reference material, unless such information is explicitly incorporated herein by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A cutting and stripping apparatus to make a strip-die, cut a sheet of stock material according to a pre-defined pattern, and to automatically remove waste material using the strip die, the apparatus including:
   a cutting surface having a cutting area on which a sheet of material may be placed;
   a stripping station surface having a stripping area on which a strip die sheet of material may be placed;
   at least one tool holder mechanism operable to controllably move a cutting tool over the cutting area and be able to controllably move a removal tool over the stripping area; and
   a controller comprising one or more processors, a connection to the at least one tool cutting mechanism, and one or more non-transitory computer-readable media that are coupled to the one or more processors, the one or more non-transitory computer-readable media having stored therein instructions that when executed by at least one processor of the controller:
   (a) cause the controller to accept a pre-determined material-cutting pattern for cutting a to-be-cut sheet of material into one or more final portions and one or more to-be-removed pieces of waste material, such that the sheet after cutting and removing of the one or more to-be-removed pieces of waste material includes the one or more final portions and one or more voids,
   (b) cause the controller to accept or determine a strip-die cutting pattern for preparing a strip die, the strip-die cutting pattern determined using the pre-determined material-cutting pattern, wherein a strip die prepared according to the strip-die cutting pattern comprises one or more openings and one or more final strip-die portions, with at least one of the one or more final portions of the cut sheet of material having a corresponding final strip-die portion in the prepared strip die, and having a shape, after cutting, that is similar to the shape of the corresponding final strip-die portion;
   (c) cause the cutting tool to cut a sheet of strip-die material that that is positioned on the cutting table surface, and cause removing one or more to-be-removed pieces of waste strip-die material, the cutting and removing preparing a strip die made of the strip-die material according to the strip-die cutting pattern, wherein the prepared strip die is positioned at a strip-die position on the stripping station surface
   (d) cause the cutting tool to cut a to-be-cut sheet of stock material that has been placed on the cutting surface according to the pre-determined material-cutting pattern, resulting in a cut sheet of stock material that includes, in cut form, the one or more final portions and the one or more to-be-removed pieces of waste material;
   (e) cause the cut sheet of stock material to be moved to the stripping station surface positioned over the strip die at a pre-determined position relative to the strip-die position such that the at least one of the one or more final portions of the cut sheet of stock material covers the corresponding final strip-die portion; and
   (f) cause the removal tool to remove the one or more to-be-removed pieces of waste material from the cut sheet of stock material.

2. A cutting and stripping apparatus as recited in claim 1, further comprising an out-stack region and a moving mechanism, wherein the instructions when executed further cause the moving mechanism to move the cut sheet of material from which the waste material has been removed.

3. A cutting and stripping apparatus as recited in claim 1, further comprising a sheet moving mechanism, wherein the instructions further cause the sheet moving mechanism to move and position the to-be-cut sheet of stock material onto the cutting table surface prior to said cutting in (d).

4. A cutting and stripping apparatus as recited in claim 1, wherein the pre-determined material-cutting pattern include one or more cuts in the waste material portion that corresponds to at least one of the openings, such that the one or more to-be-removed pieces of waste material are relatively small to ease the removing the one or more to-be-removed pieces of waste material through the openings, the instructions further comprising cutting the one or more cuts in the waste material portion that corresponds to the at least one opening.

5. A cutting and stripping apparatus as recited in claim 1, wherein the instructions when executed further cause the removed waste material to be moved from the stripping area.

6. A cutting and stripping apparatus as recited in claim 1, further comprising a moving mechanism, the instructions when executed causing the moving mechanism to carry out move the cut sheet of stock material over the strip die in (e).

7. A cutting and stripping apparatus as recited in claim 1, wherein the at least one tool holder mechanism includes a transverse rail moveable in a longitudinal direction over both the cutting surface and the stripping area under control of the controller and having a tool holder moveable on the transverse rail in a transverse direction under control of the controller and that can changeably hold both the cutting tool and the removal tool according to whether the cutting operation or the removing operation is being carried out.

8. A cutting and stripping apparatus as recited in claim 1, wherein the at least one tool holder mechanism includes a first transverse rail moveable in a longitudinal direction over the cutting surface under control of the controller and having a first tool holder holding the cutting tool and moveable on the first transverse rail in a transverse direction under control of the controller, and a second transverse rail moveable in a longitudinal direction over the stripping surface under control of the controller and having a second tool holder holding the removal tool and moveable on the second transverse rail in a transverse direction under control of the controller.

9. A cutting and stripping apparatus as recited in claim 1, wherein the instructions when executed cause removing waste material from a first sheet of stock material at the stripping station after the first sheet was cut, and causes the cutting tool to cut a second sheet of stock material that is at the cutting area, the cutting being at the same time as the removing of the waste material from the first sheet.

10. A cutting and stripping apparatus as recited in claim 1, further comprising an in-stack region whereon sheets are stacked, and a sheet moving mechanism operable to move the to-be-cut sheet of stock material to a cutting position on the cutting surface, such that the moving of the sheet of stock material onto the cutting table surface uses the sheet moving mechanism.

11. A cutting and stripping apparatus as recited in claim 10, wherein the strip-die material is the stock material, and wherein the instructions when executed further:
  cause the sheet moving mechanism move a first to-be-cut sheet of stock material from the in-stack region to cutting position on the cutting surface and
  cause the cutting tool to cut the first to-be-cut sheet of stock material to make the strip die.

12. A non-transitory computer readable medium having instructions encoded thereon that when executed by one or more processors of a controller in or coupled to a cutting and stripping apparatus, cause the apparatus to:
  cut a sheet of strip-die material that has been positioned on a cutting-table surface of the apparatus, the cutting being according to a strip-die cutting pattern,
  remove one or more to-be-removed pieces of waste strip-die material to form a strip die according to the strip-die cutting pattern, the formed strip die positioned on a stripping station surface of the apparatus;
  cut a to-be-cut sheet of stock material that is positioned on the cutting table surface, the cutting according to a pre-determined material-cutting pattern, the cutting forming a cut sheet of stock material having one or more final portions and one or more to-be-removed pieces of waste material;
  move the cut sheet of stock material to the stripping station surface positioned over the formed strip die at a pre-determined position relative to the strip-die position; and
  remove the one or more to-be-removed pieces of waste material from the cut sheet of stock material,
  wherein the strip-die cutting pattern is determined using the pre-determined material-cutting pattern, such that a to-be-cut sheet of stock material after cutting and removal of the pieces of waste material forms a sheet of stock material that includes the one or more final portions and that has one or more voids,
  wherein the prepared strip die comprises one or more final strip-die portions corresponding to the one or more final portions, and one or more strip-die openings corresponding at least some of the one or more voids;
  wherein at least one of the one or more final portions of stock material has a corresponding final strip-die portion in the prepared strip die, and has a shape, after cutting, that is similar to the shape of the corresponding final strip-die portion; and
  wherein each void in the cut sheet of stock material is smaller than the corresponding strip-die opening in the prepared strip die.

13. A computer readable medium as recited in claim 12, wherein the instructions are further configured, when executed to cause the apparatus to move the cut sheet of material from which the waste material has been removed.

14. A computer readable medium as recited in claim 12, wherein the instructions are further configured, when executed to cause the apparatus to move and position the to-be-cut sheet of stock material on to the cutting table surface prior to the cutting of the to-be-cut sheet of stock material.

15. A computer readable medium as recited in claim 12, wherein the instructions are further configured, when executed to cause the apparatus to move and position the formed-strip die on to the stripping station surface of the apparatus.

16. A computer readable medium as recited in claim 12, wherein the instructions are configured, when executed, to cause the cutting and the removing to operate in a pipeline manner, such that while a first sheet of stock material after cutting is at the stripping station surface having the waste material removed, a second sheet of stock material is at the cutting area being cut.

17. A computer readable medium as recited in claim 12, wherein the strip die material is of the same material as the sheet of stock material to be cut.

* * * * *